W. C. WEEKS.
EXCAVATING DEVICE.
APPLICATION FILED SEPT. 22, 1908.
921,928.
Patented May 18, 1909.
2 SHEETS—SHEET 1.
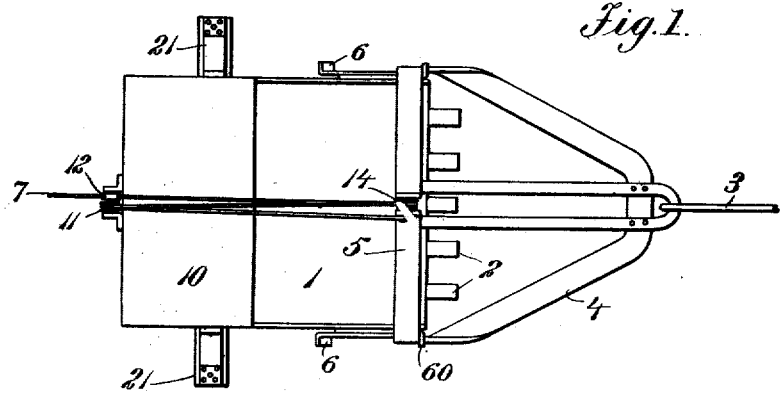
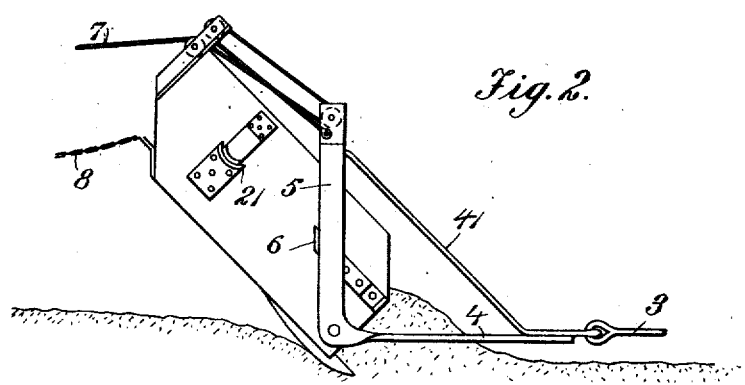
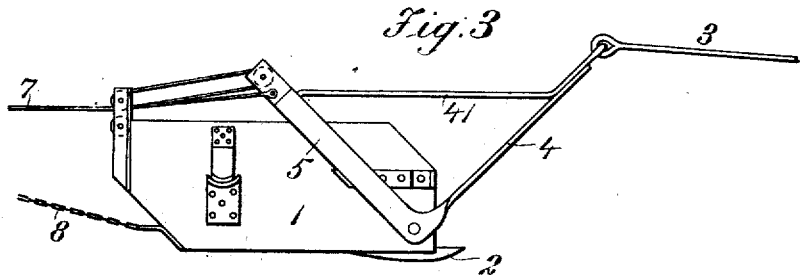
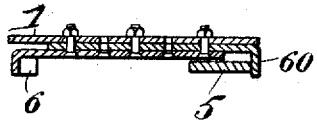

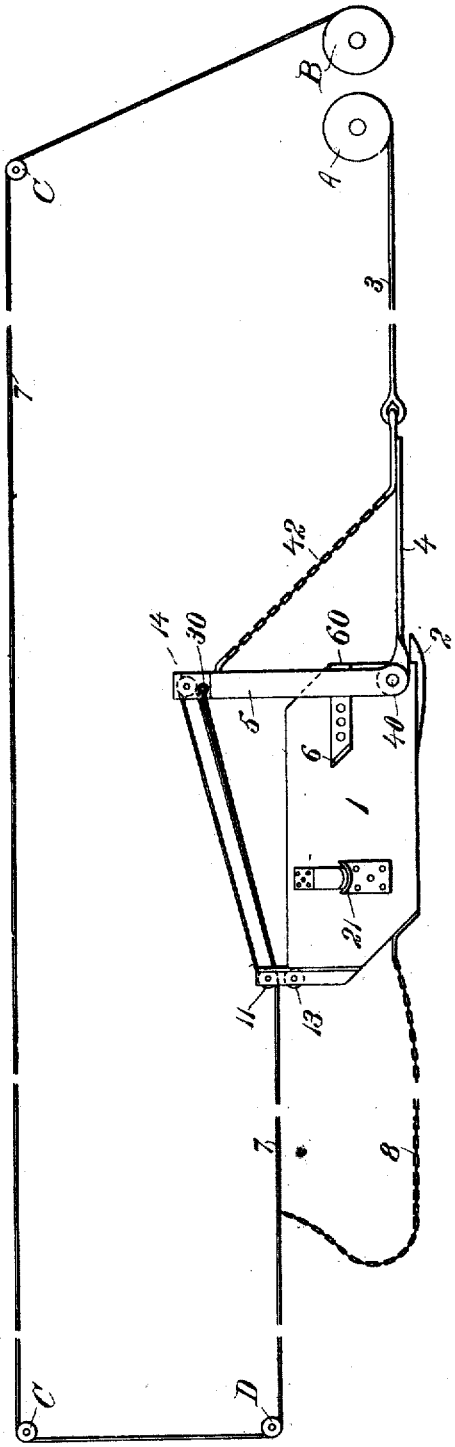
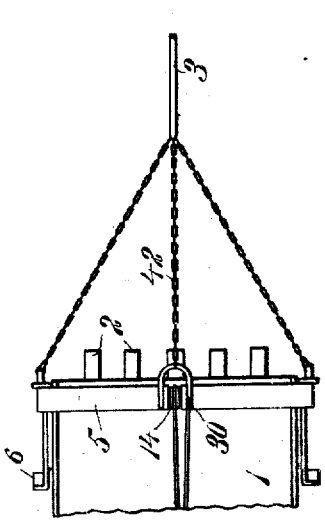

UNITED STATES PATENT OFFICE.

WILLIAM C. WEEKS, OF SEATTLE, WASHINGTON.

EXCAVATING DEVICE.

No. 921,928. Specification of Letters Patent. Patented May 18, 1909.

Application filed September 22, 1908. Serial No. 454,269.

*To all whom it may concern:*

Be it known that I, WILLIAM C. WEEKS, a citizen of the United States, and a resident of the city of Seattle, in the county of King and State of Washington, have invented certain new and useful Improvements in Excavating Devices, of which the following is a specification.

My invention relates to an improvement in a type of excavating bucket designed to be operated by a main haulage rope and a backhaul or tail rope for the purpose of moving material over specific routes.

My invention comprises means whereby through the medium of a haul-back or tail rope, the bucket may be made to assume and maintain the digging or loading position when desired.

The invention consists of the novel means whereby this result is secured and whereby the bucket as a whole and the mechanism for its operation are improved.

In the accompanying drawings I have shown my invention embodied in the form now preferred by me.

Figure 1, shows the bucket in plan in loaded position. Fig. 2, is a side elevation of the bucket in loading position. Fig. 3, is a side elevation of the bucket in the back-haul position. Fig. 4, is a side elevation of the bucket in loaded position, showing also the rope system for operating the same. Fig. 5, is a plan view showing a chain bail and connection with the yoke. Fig. 6, shows adjustable stops for the yoke.

This bucket is of that class which is especially adapted for operation by means of a draft rope and a haul-back or tail rope. The body 1, of the bucket comprises a bottom, two sides and a back, and for some situations and conditions has a partial cover 10. Teeth 2, placed upon front or cutting edge, assist materially in digging. The draft rope 3, is attached to the bucket by means of a bail 4, which is pivotally or hingedly secured to the sides of the bucket at 40. This may be of iron bars as shown in Figs. 1 to 4, or of flexible chain as shown in Fig. 5.

Hinged to the bucket, conveniently at the points where the bail is connected, is a yoke 5, which extends above the bucket. This yoke may be made integral with the draft bail 4, as shown in Fig. 2, or be a separate member as shown in Fig. 4. It is connected with the bail in such a way as to limit the separation of these parts. This connection may be a rigid bar or bars 41, as shown in Figs. 1, 2 and 3, or be a flexible connection as the chain 42, of Figs. 4 and 5. When the rigid bar is used the bail and yoke are in effect a single member having its parts maintained in fixed relation with each other. Where the connection is flexible as shown in Figs. 4 and 5, the bail and yoke may approach each other but cannot separate beyond a fixed amount.

I prefer to limit the swing of the yoke 5, relative to the bucket, as by projections from the side of the bucket. These may be made in any suitable way, as by securing a bar to the sides of the bucket as in Fig. 5, having its end turned outward. By using two bars, as in Fig. 6, a measure of adjustability may be obtained by shifting one or both upon their securing bolts.

I provide means whereby the haul-back or tail rope 7, may be used to positively tilt and hold the bucket in the position, as shown in Fig. 2. This is done by connecting the rear part of the bucket with the bail so as to draw them together, or into the position shown in Fig. 2. As herein shown the end of the haul back or tail rope is secured at 30, to the yoke thence passing about a pulley 11, mounted at the rear end of the bucket, thence about a pulley 14, upon the yoke and thence between guide pulleys 12 and 13 at the rear of the bucket. This gives the tail rope a triple purchase or pull upon the yoke so that a slight pull upon the tail rope will be sufficient to hold the bucket in the digging or loading position. These pulleys constitute guides for the tail rope. Any suitable form of guides may be used. The method of connecting the yoke with the bucket by the tail rope, need not be exclusively that shown; a greater or lesser number of pulleys and runs of rope may be employed as a greater or lesser multiplication of the power is desired.

Connected with the tail rope and the rear of the bucket or scraper, is a chain 8, which is of such length that when the yoke has been drawn back by pull upon the tail rope, and the bucket is being drawn backwardly, or to the position shown in Fig. 3, the chief strain comes upon the chain 8. This prevents excessive strain upon the yoke in such cases as when the bucket catches upon an obstruction during its return trip. This bucket would in many cases be used as a self dumping bucket. For this purpose I provide side projecting lugs 21, toward the rear of the bucket. These are designed to engage side rails or guides at the point where the bucket is to be dumped. This is a common method of dumping such buckets and is therefore not further illustrated.

The draft or main haulage rope, 3, leads from its drum A either directly to the draft bail 4, or first over guide pulleys if this be necessary. The haul-back or tail rope 7, runs from its drum B to the distant or tail-pulley D and thence to the rear end of the bucket, guide pulley C being used if necessary. In hauling the bucket outward by the tail rope it assumes a position substantially like that of Fig. 3, the main or draft rope 3 being slack. When the digging or loading point is reached strain is placed upon the draft rope and most of the strain removed from the tail rope. This tips the bucket into substantially the position shown in Fig. 2 in which the tendency is for the bucket to bury itself in the material. When it has been sufficiently filled strain is removed from the tail rope, whereupon the bucket settles toward a horizontal position and quickly rises and rides upon the surface of the material.

What I claim is:

1. An excavating device comprising a bucket, a draft bail and a yoke connected together and pivoted to the bucket, and rope guides carried by said yoke and the rear end of the bucket.

2. An excavating device comprising a scraper bucket, a draft bail and yoke connected together and pivoted to the bucket, stops limiting the swing of the yoke upon its pivots, and rope guides carried by the yoke and by the rear end of the buckets.

3. An excavating device comprising a scraper bucket, a draft bail secured to the front lower part of the bucket, a draft rope secured to the bail, a yoke pivoted to the bucket and connected with the bail to limit their angular separation, a tail rope and guides for the tail rope carried by the yoke and by the rear end of the bucket.

4. An excavating and transporting device comprising a bucket or scoop, a draft bail and up-standing yoke connected together and pivoted upon the bucket, a draft rope attached to the draft bail a haul-back rope, a tail pulley for the haul-back rope, and means whereby the yoke and the rear part of the bucket may be drawn together by a strain upon the haul-back rope.

5. An excavating bucket having a draft bail, a yoke pivoted to the bucket and having a limiting connection with the bail, means connecting the tail rope direct with the bucket, and rope guides carried by the yoke and the rear end of the bucket and adapted to receive the tail rope.

6. An excavating bucket having a draft bail and yoke pivoted to the bucket and having a limiting connection with each other, means for connecting a tail rope directly with the rear end of the bucket, and means whereby the relative angular positions of the yoke and bucket is controlled by the draft on the tail rope.

7. An excavating bucket having a draft bail and a yoke pivoted to the bucket and having a limiting connection with each other, and means whereby the relative angular position of the yoke and the bucket may be controlled by a tail rope.

8. An excavating and transporting device comprising a bucket, a draft bail, and a yoke pivoted to the bucket and having a limiting connection with the draft bail, a tail rope, tail rope guides carried by the yoke and by the rear end of the bucket, and an independent draft connection of the tail rope with the bucket brought into action when the yoke is drawn back by the tail rope.

9. An excavating device comprising a bucket or scoop a draft bail and upstanding yoke connected together and pivoted to the bucket, guide rollers carried by the yoke and by the rear part of the bucket, a haul-back rope rove about said rollers to draw the yoke and rear part of the bucket together, a draft rope connected with the draft bail, a power operated drum for each of said ropes, and a tail pulley for the haul-back rope.

In testimony whereof I have hereunto affixed my signature at Seattle, Washington, this 15th day of September, 1908.

W. C. WEEKS.

Witnesses:
JAMES G. COMBS,
T. G. McCRORY.